United States Patent [19]
Zimmer

[11] 3,915,563
[45] Oct. 28, 1975

[54] SNOWMOBILE REAR VIEW MIRROR
[75] Inventor: Steven Zimmer, Kitchener, Canada
[73] Assignee: The Raymond Lee Organization Inc., New York, N.Y. ; a part interest
[22] Filed: July 18, 1974
[21] Appl. No.: 489,562

[52] U.S. Cl. .............................. 350/307; 350/288
[51] Int. Cl.² .................................. G02B 5/08
[58] Field of Search ............ 350/307, 288, 292–296, 350/299, 301, 302, 303, 304; 180/84 B, 105 R

[56] References Cited
UNITED STATES PATENTS
| | | |
|---|---|---|
| 730,361 | 6/1903 | Fyfe .................................. 350/307 |
| 2,607,273 | 8/1952 | Lark ................................. 350/307 |
| 3,659,929 | 5/1972 | Yuzawa ............................ 350/307 |

Primary Examiner—Vincent P. McGraw
Assistant Examiner—Jon W. Henry
Attorney, Agent, or Firm—Howard I. Podell

[57] ABSTRACT

A snowmobile rear view mirror which mounts on the cowl of a snowmobile on either side of the windshield. The lower half of the mirror projects from a conical housing which mounts on the cowl of the vehicle.

2 Claims, 3 Drawing Figures

SNOWMOBILE REAR VIEW MIRROR

SUMMARY OF THE INVENTION

My invention relates to a snowmobile rear view mirror which mounts on the cowl and dash of a snowmobile at either side of the windshield. The snowmobile rear view mirror projects below a cone shaped hollow housing which is mounted on the cowl of the vehicle so that the lower half of the mirror rests within the confines of the vehicle. The mirror may be shaped in a convex wide-angle configuration.

BRIEF DESCRIPTION OF THE DRAWING:

The objects and features of the invention may be understood with reference to the following detailed description of an illustrative embodiment of the invention, taken together with the accompanying drawings in which.

Figure 1:
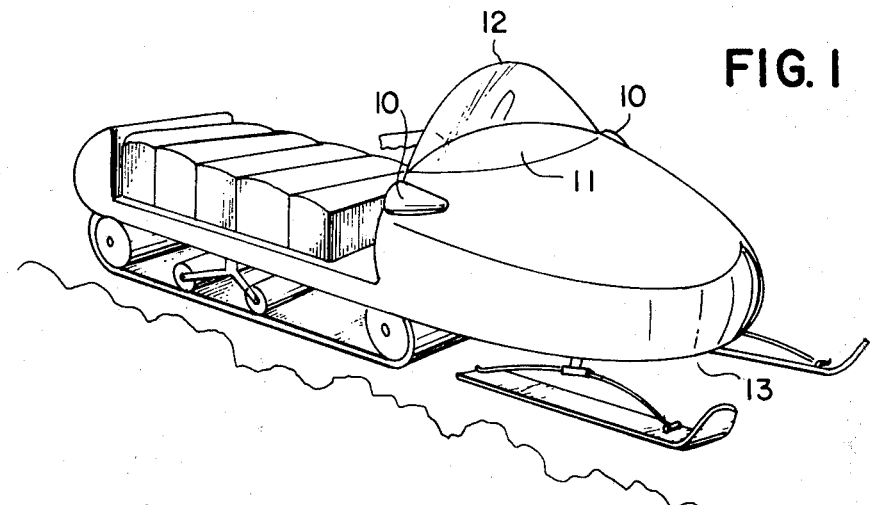
FIG. 1 illustrates a perspective view of the invention in use.
Figure 2:
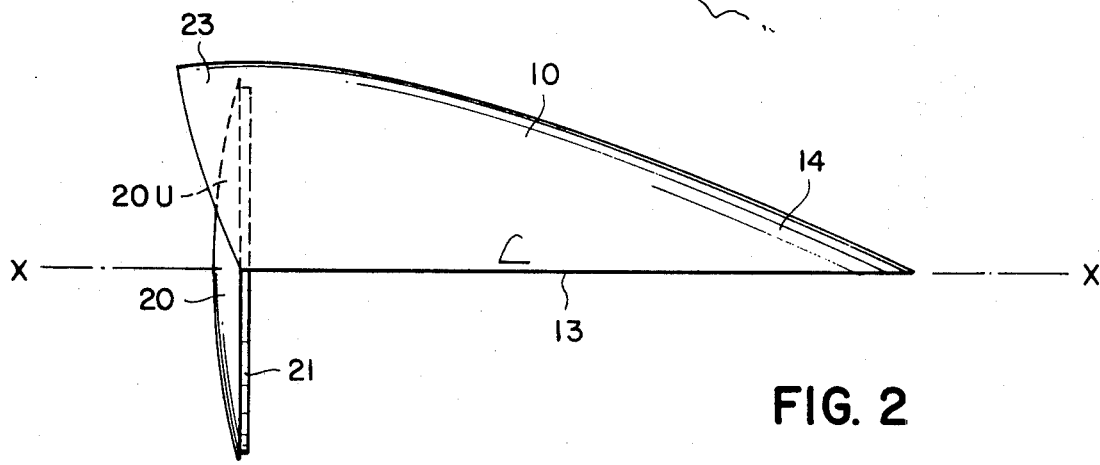
FIG. 2 illustrates a side view of the invention.
Figure 3:
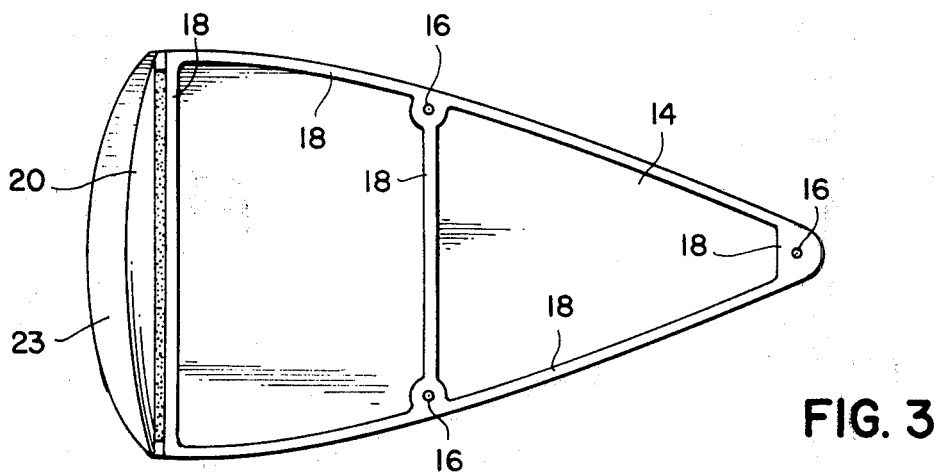
FIG. 3 illustrates a bottom view of the invention.

DESCRIPTION OF THE PREFERRED EMBODIMENT:

Turning now descriptively to the drawings, in which similar reference characters denote similar elements throughout the several views, FIG. 1 shows a snowmobile rear view mirror 10 mounted on each side of the cowl 11 of a snowmobile 13, with each mirror 10 positioned at opposite sides of the windshield. As shown in FIGS. 2–3, the mirror 20 is mounted so that the upper section 20U of the mirror is fastened to a conical housing 14, with the lower section of the mirror projecting below the plane X—X of the mounting surface 18 of the housing 14 so that the lower section of the mirror 20 fits within the confines of the snowmobile cockpit when the housing 14 is externally mounted on the cowl 11 of the vehicle 13. The housing 14 may be hollow, with the mounting surface 18 being the edge of a rim and reinforcement strip of the housing body 14.

The mirror 20 may be shaped in convex fashion as a wide angle reflector and is fastened to the housing 14 and the interior of the snowmobile by an adhesive coating 21 on the back of the mirror. A projection 23 of the hood of the housing 14 covers the top of the mirror to serve as a shield. Holes 16 in the housing serve for mounting purposes.

The mirror 20 is protected from damage by the hood 23 of the housing 14 and by the location of the lower section of the mirror within the confines of the vehicle, when mounted.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A mirror assembly mounted on a snowmobile, comprising a mirror, a housing fastened to and surrounding the upper section of said mirror, said housing mounted externally on the cowl of the snowmobile adjacent to the rear end of said cowl, which cowl covers the forward end of the snowmobile, with the rear end of the cowl terminating at the forward section of the open cockpit of the snowmobile, said housing located on the exterior of the cowl and extending forward of the rear end of the cowl, with the mirror fastened to the rear of said housing so as to extend below the housing and the cowl into the confines of the cockpit of the snowmobile.

2. The combination as recited in claim 1 in which a portion of the housing projects rearwards about the section of the mirror fastened to the housing as a continuation of the housing, said portion being generally perpendicular to the plane of the mirror so as to serve as a hood over the upper edges of the mirror.

* * * * *